March 8, 1960 F. H. AINSWORTH 2,927,716
FLUID PROPORTIONING AND DISPENSING APPARATUS
Filed May 15, 1957 8 Sheets-Sheet 3

INVENTOR.
Freedom H. Ainsworth
BY
ATTORNEY.

INVENTOR.
Freedom H. Ainsworth

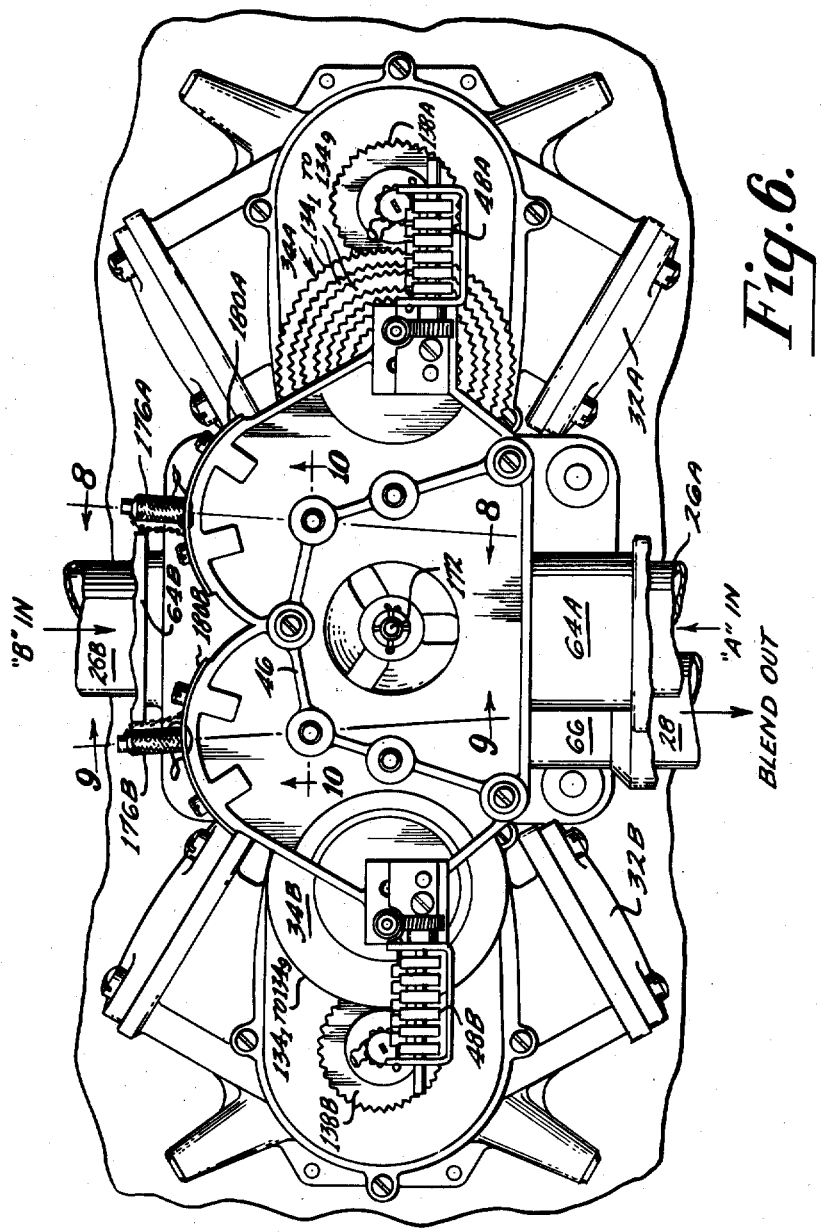

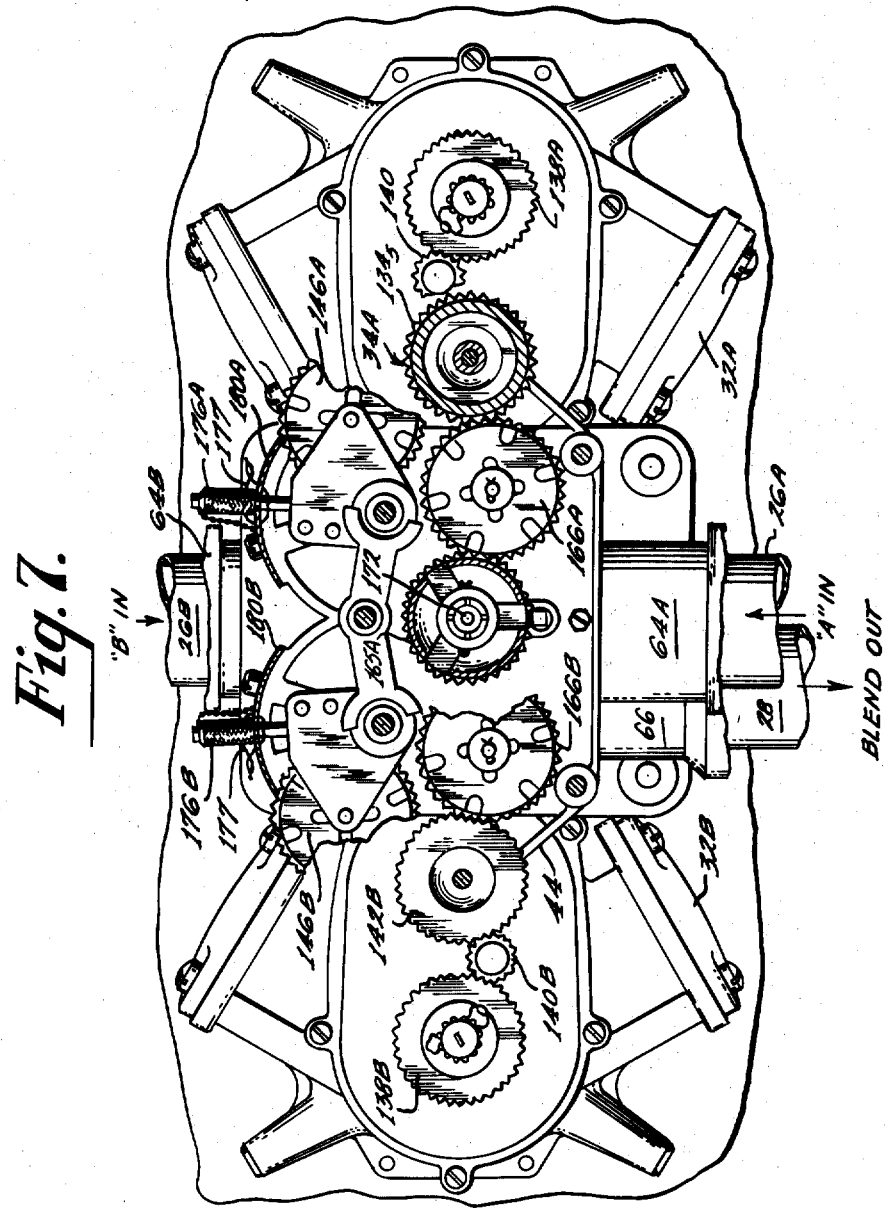

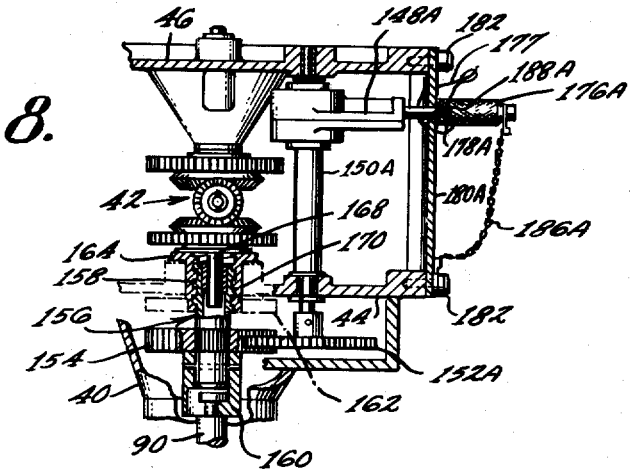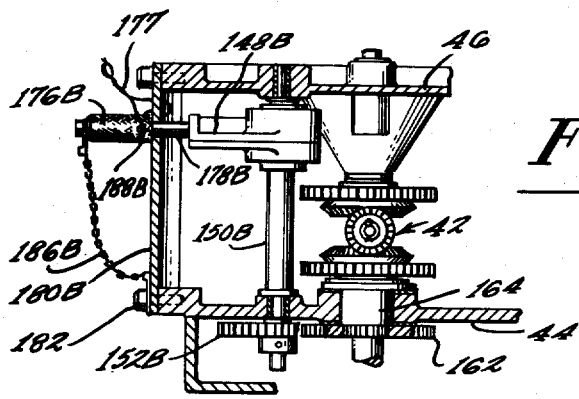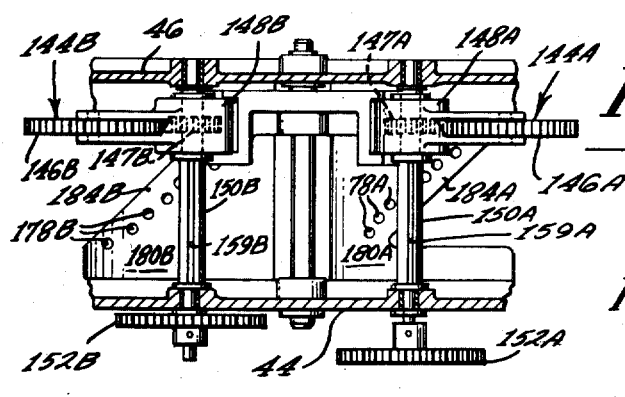

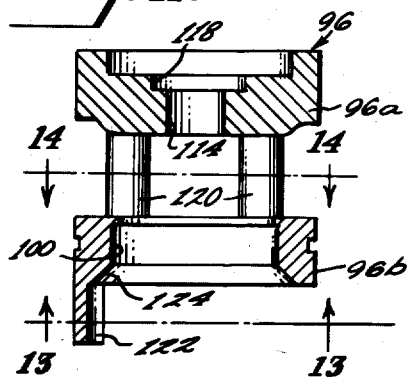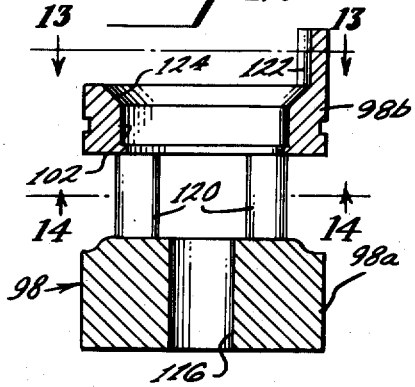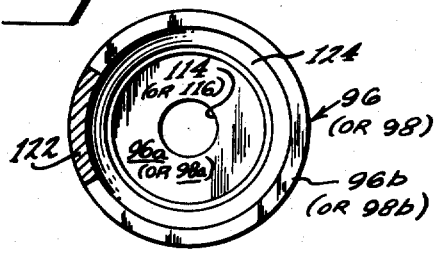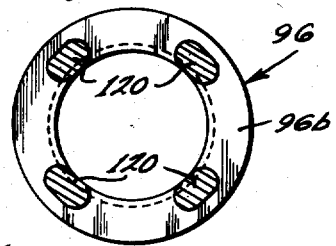

United States Patent Office 2,927,716
Patented Mar. 8, 1960

2,927,716

FLUID PROPORTIONING AND DISPENSING APPARATUS

Freedom H. Ainsworth, Salisbury, Md., assignor to Symington Wayne Corporation, Salisbury, Md., a corporation of Maryland Application May 15, 1957, Serial No. 659,743

21 Claims. (Cl. 222—28)

This invention relates to an apparatus for proportioning and dispensing two dissimilar fluids, and more particularly relates to an apparatus for proportioning and dispensing a blend of two different liquids, for example, gasolines having dissimilar octane ratings.

Various proportioning and blending dispensers have been proposed for use in gasoline service stations. These dispensers include a large number of components including proportioning valves, which must be assembled in precise relationship within the casing of the dispenser. Heretofore, these components have been assembled and adjusted within the dispenser casing which is both difficult and time consuming. Assemblies of this type also occupy an inordinate amount of space.

An object of this invention is to provide a simple, compact and dependable apparatus for proportioning and dispensing a blend of two dissimilar fluids which is economical to fabricate and assemble.

Another object is to provide an apparatus of the aforementioned type which may be assembled in a unit before it is installed in the dispenser casing.

In accordance with this invention, a novel proportioning and dispensing apparatus includes a valve block which is internally channelled to provide essential fluid conduits. These conduits provide means for conducting the different fluids into a proportioning valve chamber and means for conducting the proportioned fluid from the valve chamber. Passageways including check valves may also be provided in the block between the meters and the valve chamber.

This valve block or structure may also be conveniently utilized to support the other operative components of a convenient unitary proportioning device or assembly. The meters themselves may be mounted directly upon the cored structure with their inlet and outlet conduits disposed in alignment with cooperative passageways or conduits in the channelled structure. A variable ratio transmission may be mounted upon the block in operative engagement with the meter shafts and corresponding portions of a comparing differential for controlling the position of a valve element disposed within the proportioning chamber of the valve block. This differential regulates the position of the valve element in accordance with the relative proportions of the dispensed fluids. An adding differential providing a sum of the shaft rotations of the two meters may also be conveniently supported from the block. A highly compact and rugged assembly may be provided by mounting a variable ratio transmission, a valve element, a comparing differential, and the adding differential between a pair of housing plates or elements supported upon the valve block. An exceedingly compact and simple unit of this type may incorporate a cone gear and idler variable ratio transmission, a nut and screw type comparing differential, and a cage type adding differential whose lower portion is supported within a bearing included within the nut and screw type differential.

A highly simple and efficient automatically controlled proportioning valve for use, for example, in a unitary proportioning and dispensing assembly of the aforementioned type includes a reciprocating valve element disposed within a cylindrical chamber. A nut and screw type differential may be mounted in line with the proportioning valve stem. Movement of the differential, therefore, directly controls the position of the valve without the necessity of a complicated and bulky transmission.

A highly compact and efficient proportioning valve device includes, for example, a cylindrical proportioning chamber having fluid inlets near opposite ends and an outlet disposed therebetween. Circumferential projecting elements are disposed about the inner wall of the cylindrical proportioning chamber on both sides of the outlet. A reciprocating valve element is mounted between the projecting elements to control the relative proportions of fluid entering the outlet from the respective inlets. An advantageous valve element which provides both throttling control and full shut off of one fluid, if the supply of the other fluid should be exhausted, includes a central larger diameter closure element mounted between a pair of tapered throttling elements. These tapered throttling elements may be made of a wear-resistant material to prevent deterioration during severe throttling service, and the central closure element may be made, for example, of an elastic material to facilitate full shut off. The throttling elements are of relatively smaller diameter to permit them to pass between the projecting elements when the control element contacts a projection to provide full shut off.

The fluids may be blended with each other as well as proportioned within the proportioning chamber or an elastic diaphragm may be attached to the valve element and mounted within the chamber to maintain the proportioned fluids separate from each other. Under these conditions, a divided outlet is provided with the diaphragm attached to a point between the sections. A divided fluid proportioning system could be advantageously used, for example, when the dispenser ratio is frequently changed to provide different blend ratios for individual customers.

A means for locking and sealing the ratio shifting controls for the variable ratio transmission which regulates the relative proportions of the fluids in the blend, may be provided to prevent tampering with the controls after they have been set and certified by a gasoline company. This sealing device may be exposed to the customer by, for example, mounting it behind a transparent panel to reveal at a glance to the customer that the controls are locked and sealed in positions which provide a blend which is certified by a responsible authority to be a predetermined percentage of the cost of the two base fluids. A tag indicating the certified price of the blend might also be incorporated in the seal.

Novel features and advantages of the present invention will become apparent to one skilled in the art from a reading of the following description in conjunction with the accompanying drawings wherein similar reference characters refer to similar parts and in which:

Fig. 6 is a plan cross-sectional view of the embodiment shown in Fig. 3 taken along the line 6—6 and looking in the direction of the arrows;

Fig. 7 is a cross-sectional view taken through Fig. 3 along the line 7—7 and looking in the direction of the arrows;

Fig. 8 is a cross-sectional view taken through Fig. 6 along the line 8—8 and looking in the direction of the arrows;

Fig. 9 is a cross-sectional view taken through Fig. 6 along the line 9—9 and looking in the direction of the arrows;

Fig. 10 is a cross-sectional view taken through Fig. 6 along the line 10—10 and looking in the direction of the arrows;

Fig. 11 is a cross-sectional view in elevation of a portion of the embodiment shown in Fig. 3.

Fig. 12 is a cross-sectional view in elevation of another portion of the embodiment shown in Fig. 3;

Fig. 13 is a sectional view taken through either Figs. 11 or 12 along the line 13—13 and looking in the direction of the arrows;

Fig. 14 is a cross-sectional view taken through either Figs. 11 or 12 along the line 14—14 and looking in the direction of the arrows;

Fig. 15 is a cross-sectional view of a modification of a portion of the embodiment shown in Fig. 3;

Fig. 16 is a perspective view of a cover panel for the dispensing unit shown in Fig. 1; and Fig. 17 is an enlarged view of a portion of the embodiment shown in Fig. 1.

Figure 1:
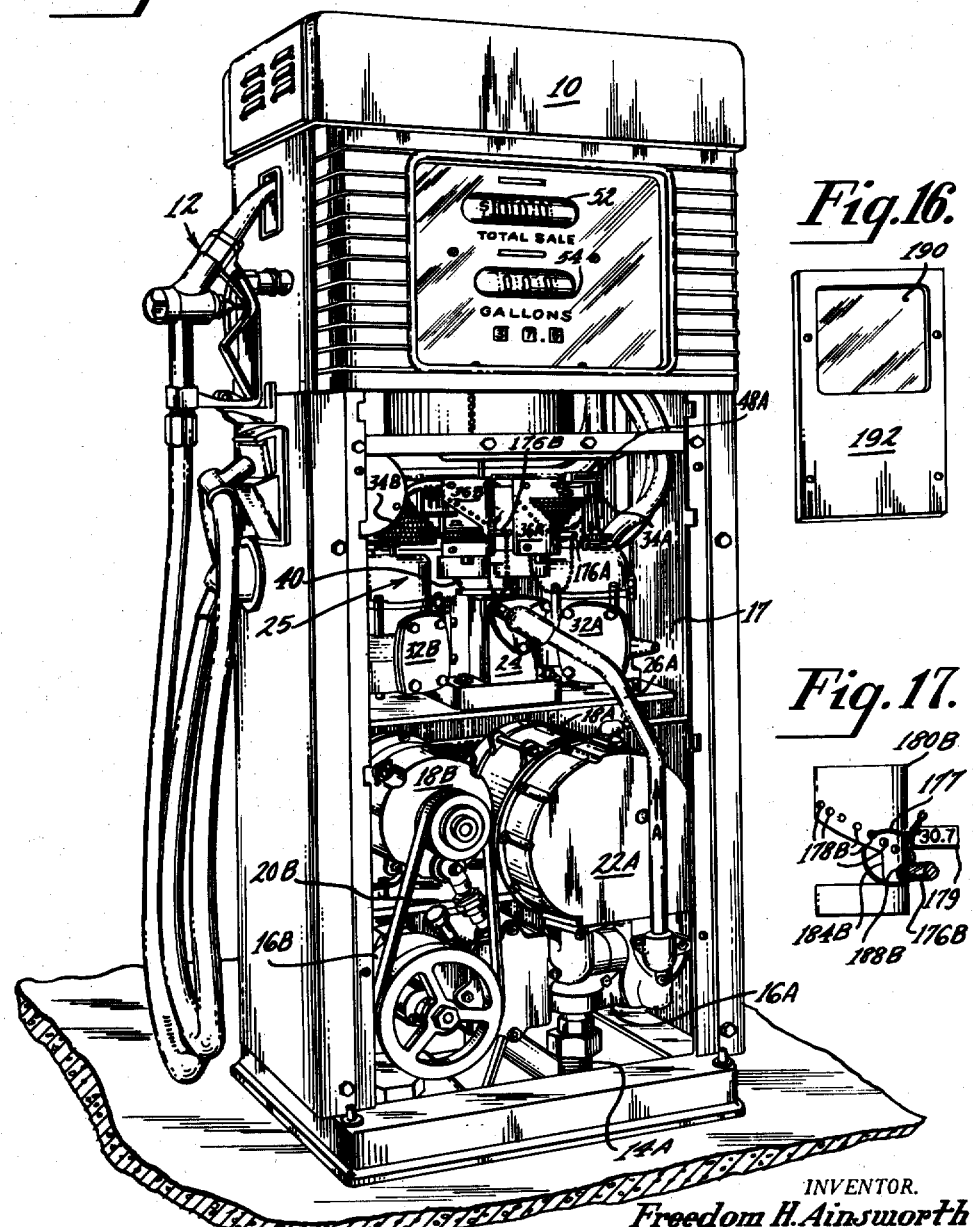
Fig. 1 is a perspective view of an embodiment of this invention installed in a gasoline dispensing unit.
Figure 2:
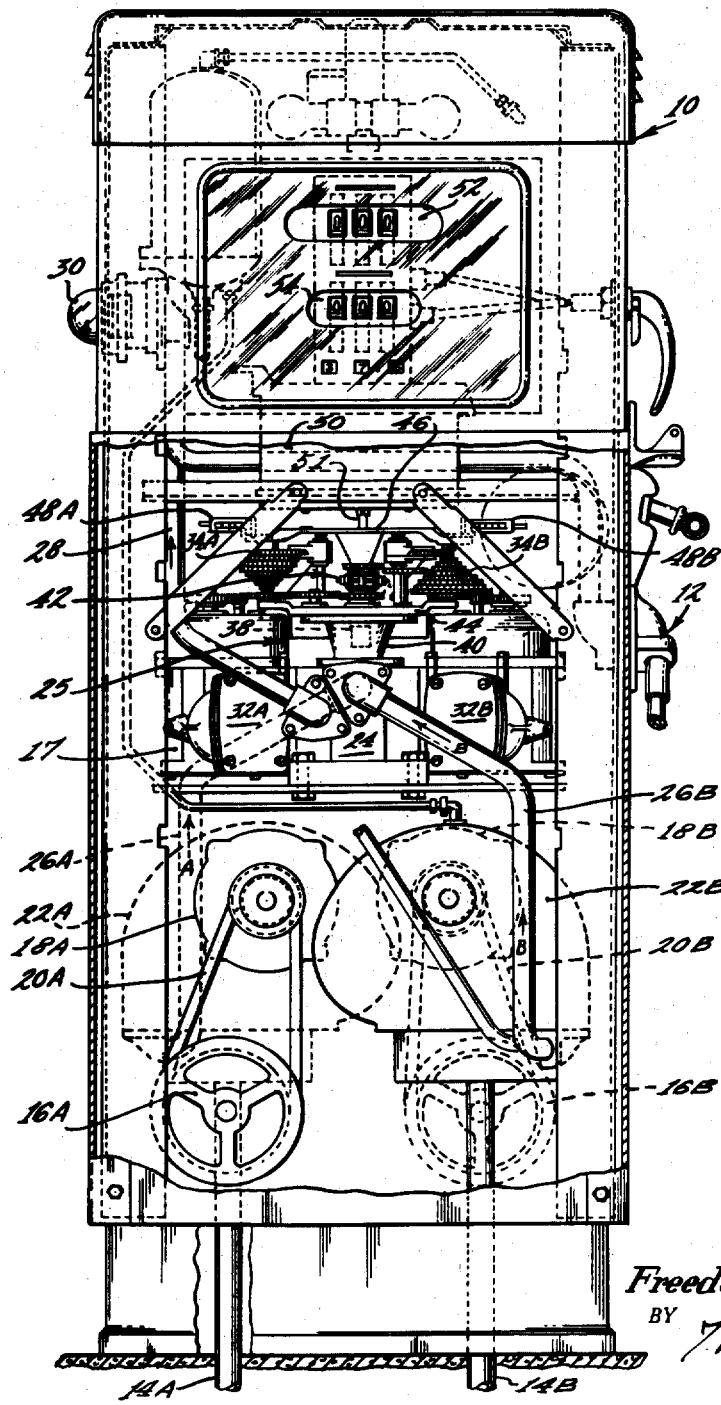
Fig. 2 is a rear view in elevation of the embodiment shown in Fig. 1.

Figs. 1 and 2 respectively show the front and rear of an apparatus 10 for dispensing a mixture of two fluids, different octane rating gasolines for example, through a conventional dispensing hose and nozzle assembly 12 for example. These two grades of gasoline are supplied to apparatus 10 from two separate tanks A and B, not shown, through supply pipes or conduits 14A and 14B for example. For convenience of representation, the components described in this specification which respectively accommodate the fluids from tanks A and B are respectively designated by the letters "A" and "B."

The A and B grades of gasoline are respectively pumped through pipes 14A and 14B by means of pumps 16A and 16B. These pumps are mounted along with their respective electric motors 18A and 18B within a conventional gasoline dispenser casing 17. Electric motors 18A and 18B drive pumps 16A and 16B by means of conventional V-belts and pulley drives 20A and B, for example. Air eliminators 22A and 22B are provided for removing entrained air from the gasoline. From air eliminators 22A and B, fluids A and B are delivered to a proportioning valve structure or block 24 respectively through supply conduits 26A (Fig. 1) and 26B (Fig. 2). Fluids A and B are proportioned and mixed, for example, within proportioning valve structure 24 and discharged through outlet conduit 28 which connects to the dispensing hose and nozzle assembly 12 through a visible flow indicator 30, for example.

Proportioning valve structure or block 24 includes a valve chamber and element (later fully described) and various passageways or channels for directing and controlling the flow of A and B fluids prior, during, and subsequent to proportioning. Unit structure or block 24 also provides a means for supporting the other operative components of the unitary proportioning assembly 25 such as meters 32A and B and variable ratio transmission components 34A and B. Ratio shifting devices or idlers 36A and B connect meters 32A and B to a meter speed comparing differential 38 mounted within housing 40. The adding differential 42 is connected to meters 32A and B by a fixed ratio transmission. Variable ratio cone and idler transmission assemblies 34A and B, and adding differential 42 are supported between a pair of housing plates 44 and 46 mounted upon housing 40. A pair of totalizers 48A and B are respectively mounted upon cone transmission gears 34A and B to record the total revolutions of meters 32A and B respectively. The sum of the rotations of meters 32A and B is transmitted to computer 50 through shaft 51 which is driven by adding differential 42. Computer 50 is, for example, a counter mechanism of the type described in U.S. Letters Patent 2,264,557. This counter mechanism includes indicating registers 52 and 54 for respectively indicating, for example, the cost and gallonage of the blend of gasoline delivered to the customer. Since the proportioning valve 24 maintains the relative portions of A and B fluids at a predetermined ratio, a predetermined cost may be established for the total of the gallonage delivered by each meter. This cost factor may, therefore, be used to actuate a standard computer mechanism of the type which might be used for a single fluid. Meters 32A and B are also, for example, of the type described in U.S. Letters Patent 2,756,726. Each other component of the unitary proportioning assembly shown in Figs. 1 and 2 between standard computer or counting device 50 and pumps 16A and B and air eliminators 22A and B is described in detail in the following together with the details of their assembly which incorporates them into a simple and dependable unitary device which may be carefully manufactured and assembled before it is installed in the position shown within the dispensing apparatus casing. Other portions of the dispensing apparatus which do not directly relate to the proportioning assembly are merely indicated schematically in the drawings and are not described in detail in order to facilitate a brief description of this invention.

In Figs. 3–14 are shown details of a unitary proportioning assembly 25. This assembly includes the various components and sub-assemblies previously functionally designated. Proportioning valve structure 24 is a channelled block 24 for example, including various passageways or conduits. This block is made from an iron casting for example. The lower portion of block 24 is joined by a base 62 which includes additional passageways which cooperate with the passageways in block 24.

Referring to Figs. 3–7, conduits 26A and B, respectively carrying the A and B fluids, are connected to flanged inlets 64A and B (Figs. 6 and 7). The proportioned mixture is discharged through conduit 28 from flanged outlet 66 (Figs. 6 and 7).

Figure 3:
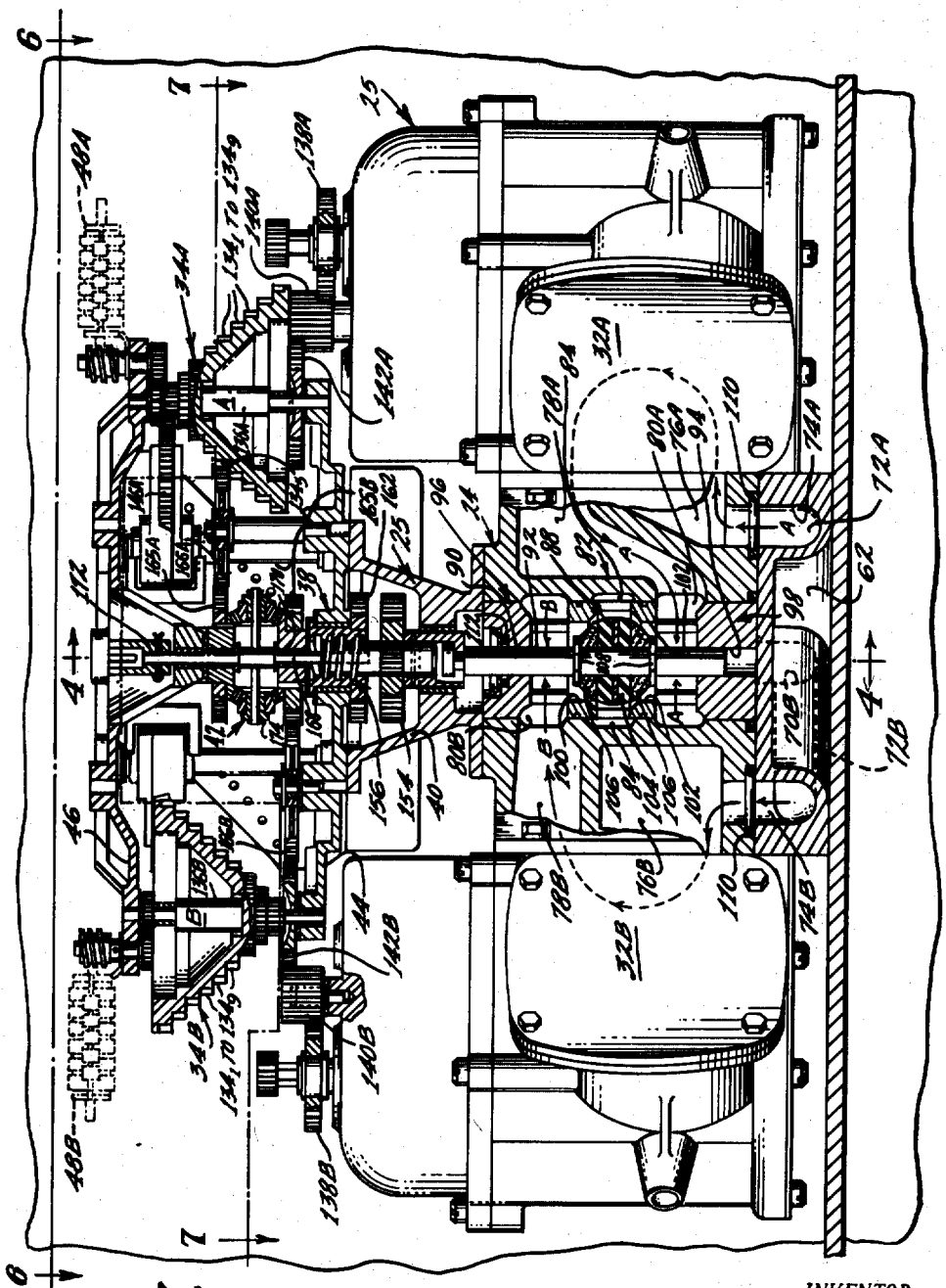
Fig. 3 is a front view in elevation, partially broken away, in cross section of the embodiment shown in Fig. 1.
Figure 4:
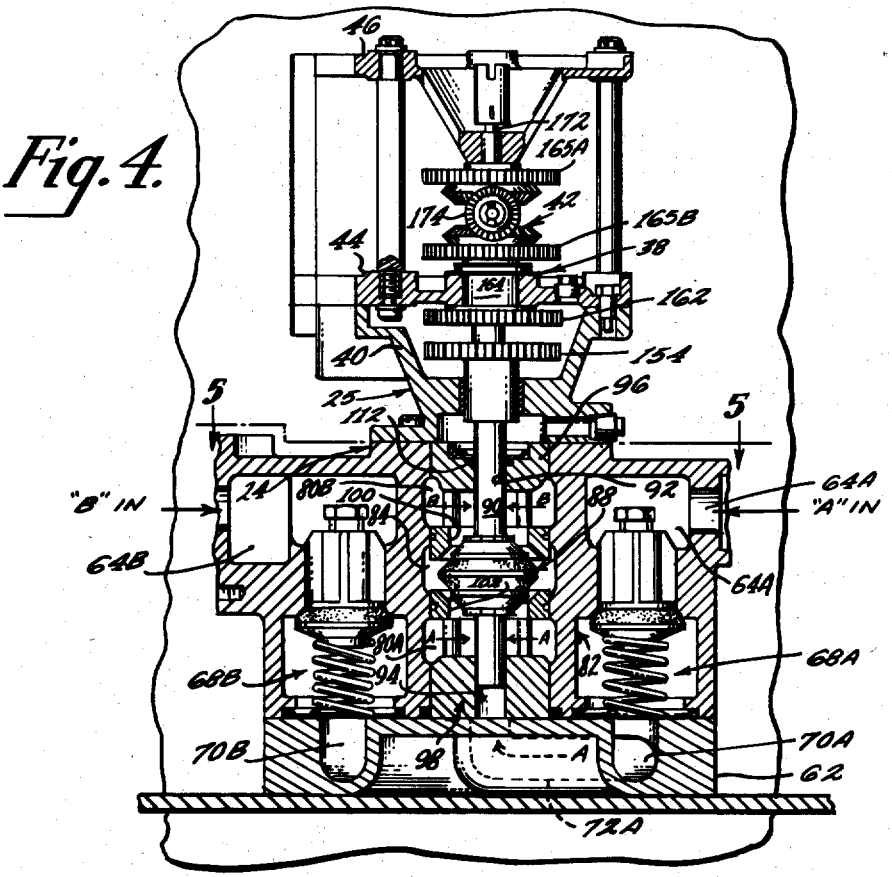
Fig. 4 is a cross-sectional view taken through Fig. 3 along the line 4—4 and looking in the direction of the arrows.

Referring to Fig. 4, the A and B fluids are respectively conducted through check valve chambers 68A and B into passageways 70A and B in the base 62. The A fluid is carried through lateral passageway 72A (Fig. 4) and through vertical passageway 74A in casing 62 (Fig. 3) which connects to chamber 76A in block 24 which provides a flow of A fluid to meter 32A. As shown in Fig. 3, the B fluid is carried laterally through passageway 72B in base 62 from which it is carried vertically through passageway 74B in base 62 and block 24 and then into chamber 76B in block 24 from which it enters meter 32B. Chambers 78A and B respectively carry the A and B fluids from meters 32A and B to inlets 80A and B at opposite ends of a cylindrical proportioning valve chamber 82. The proportioned fluid which is mixed, for example, as well as proportioned within chamber 82 is carried off through outlet 84 disposed in the wall of chamber 82 between inlets 80A and B.

Figure 5:
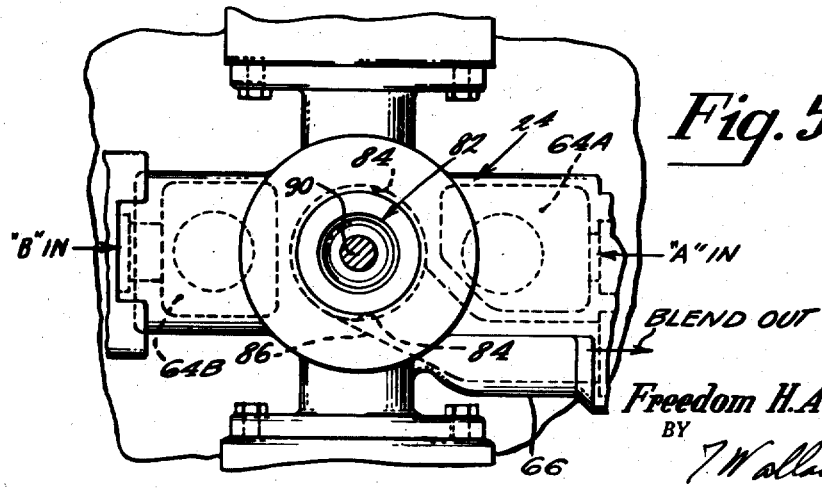
Fig. 5 is a cross-sectional view taken through Fig. 4 along the line 5—5 and looking in the direction of the arrows.

Referring to Fig. 5, the proportioned fluid is collected from outlet 84 which, for example, surrounds the circumference of valve chamber 82. The proportioned fluid is discharged from outlet 84 by tapered conduit 86 which connects with the flanged outlet 66.

Referring to Figs. 3 and 4, a valve element 88 is reciprocally mounted, for example, in chamber 82 upon a stem 90. Stem 90 is inserted within bearings 92 and 94 respectively provided within a pair of ported sleeves 96 and 98 inserted within chamber 82. Referring to Figs. 3 and 4 in conjunction with Figs. 11–14, cylindrical ported sleeves 96 and 98 include adjacent cylindrical projections 100 and 102 disposed on either side of valve element 88. These cylindrical projections in cooperation with the adjacent surfaces of valve element 88 provide means for totally shutting off the flow of fluid from either inlet 80A or B. Valve element 88 includes, for example, a central projection 104 which may be moved into contact with either cylindrical projection 100 or 102 to shut off the fluid from either inlet ports 80A or B. Element 88 also includes on both sides of projections 104 tapered elements 106 which clear the inner circumference of projections 100 and 102 to permit full closure by means of central element 104. Valve elements 104 and 106 are secured, for example, to shaft 90 between lock washers 108.

Inserts or sleeves 96 and 98 are made of a corrosion resistant material such as brass, for example, and valve stem 90 is made of a strong corrosion resistant material, for example, stainless steel. Tapered elements 106 are made of a material which is resistant to wear and corrosion by fluid flow such as, for example, cadmium plated cold rolled steel or stainless steel. Mating portions of block 24, base 62 and inserts 96 and 98 are sealed by means of O-ring gaskets 110. A seal 112 is installed in insert 96 about stem 90 to prevent leakage of fluid between the valve stem 90 and the sleeve bearing 92.

Valve element 88 is moved upward and downward between cylindrical projections 100 and 102 to regulate the fluid respectively entering outlet 84 from inlets 80B and A. This maintains a predetermined ratio of A and B fluid in the mixture discharged from outlet 84. If the supply of either A or B fluid is exhausted, the valve stem travels as far as possible in the direction of the inlet of the opposite fluid which causes the central valve element 104 to contact the projection relating to this fluid which immediately shuts it off. A failure in the supply of either liquid, therefore, automatically fully shuts off the supply of the other liquid.

Figs. 11–14 show details of cylindrical inserts or sleeves 96 and 98. These cylindrical inserts respectively include two cylindrical rings 96a and b and 98a and b. Rings 96a and 98a provide relatively small central apertures 114 and 116 respectively for guiding the valve stem 90. Hole 114 includes a shouldered recess 118 for accommodating sealing member 112. As shown in Fig. 14, the inner rings 96b and 98b are separated from the outer rings 96a and 98a by means of four posts 120 which provide therebetween, apertures for passage of the A and B fluids into the chamber 82. Inner rings 96b and 98b are held a predetermined distance apart by means of a pair of posts or fingers 122 one of which is attached to each of the inner rings 96b and 98b. The length of these posts governs the clearance between the throttling and the sealing elements 104 and 106 of valve element 88 and the projecting circumferential elements of the cylindrical chamber. The throttling and sealing projections are provided by the beveled inside diameter 124 of the inner rings 96b and 98b. These beveled surfaces enclose the sealing elements 104 of the valve member and provide a positive seal when contacted by sealing elements 104 when moved to the full extent of travel in either direction. The independence of inserts 96 and 98 permits them to be assembled about the valve stem and elements to thereafter limit travel of the valve element in both directions. Since only two posts or fingers 122 occupy the space between the inner rings 96b and 98b, the fluid mixture may proceed unimpeded from the valve chamber 82 into the outlet 84.

In Fig. 15 is shown a modification of the valve arrangement which permits the A and B fluids to pe proportioned by means of valve element 88a yet be maintained separate and unmixed within chamber 82a. This separation is advantageous when it is desired to frequently change the proportions of the blend. The A and B fluids in such a dispenser are mixed within the dispensing nozzle so that the customer receives the full amount of the blend that he is paying for.

To accomplish this separation, a flexible diaphragm 126 is mounted upon sealing element 104a of valve element 88a, as shown in Fig. 15. This flexible separator 126 is made, for example, of neoprene. Separator 126 extends completely through valve 82a and outlet 84a. It is anchored in the wall 128 of channelled block 24 between a pair of passages 130 and 132 which respectively carry the A and B mixtures to a mixing nozzle (not shown). The particular dispenser described herein, however, continuously provides one ratio of fluid, and there is, therefore, no reason to prevent mixing of the blends within cylindrical chamber 82 and outlet 84. When the ratio is changed by the vendor, the dispenser is discharged for a short time to clear the lines of the previous blend.

In Figs. 3, 4 and 8–10, details of the variable ratio transmissions 34A and B, operatively connecting meters 32A and B with the stem 90 of valve element 88 are shown. Transmissions 34A and B each include a cone of spur gears $134_1$ to $134_9$. These cones of gears 134 are mounted upon shafts 136A and B which are supported in bearings in the upper and lower housing plates 46 and 44. These cones of gears are rotated by a spur gear train including gears 138A and B and 140A and B mounted respectively upon the operating shafts of meters 32A and B. The drive to the cones of gears is accomplished through auxiliary spur gears 142A and B respectively mounted on cone gear shafts 136A and B. Gears 142A and B are identical to a step $134_5$, for example, of the meter 32A cone of gears to permit gear $134_5$ to be used for transmitting the motion of meter 32A to the adding differential 42 as well as providing a ratio varying component.

The respective connections of the cones to the comparing differential 38 which actuates the valve stem 90 are made through a pair of vertically adjustable idler gear assemblies 144A and B (see Fig. 10) which include spur gears 146A and B which respectively engage corresponding spur gears on the cones of gears. The cones of gears are mounted in inverted relationship so that idler gears 146A and B may be moved simultaneously in line with each other to provide successively graduated ratios therebetween. The number of teeth of the gears and their diameters are chosen, for example, to provide 10% relative ratio increments for each parallel set of gears in conjunction with the screw and nut type differential 38 which governs movement of valve stem 90.

The transmission through the idler gear assembly is accomplished by means of pinion gears 147A and B mounted within movable collars 148A and B. Pinion gears 147A and B move vertically up and down idler gear shafts 150A and B in key-ways 159A and B. Idler gear shaft 150A is connected to the nut and screw type differential 38 by means of a spur gear 152A which is meshed with a spur gear 154. Gear 154 is incorporated in the screw assembly 156 of the nut and screw type differential. The upper end of the assembly 156 includes for example, an externally square-threaded member 158, and at its lower end, includes a yoke 160 for rotatably engaging valve stem 90 (see Fig. 8).

Idler gear shaft 150B (Fig. 9) is operatively connected to the nut portion of the differential 38 by a spur gear 152B meshed with another spur gear 162 which is rigidly secured to the internally threaded nut member 164. The gears of the respective transmissions to the nut and screw type differential 38 are selected so that stem 90 is immobilized in a vertical direction when gears 154 and 162 are rotated at identical speeds. If the speeds of these gears are varied, the nut and screw are given a relative motion which repositions valve stem 90 to adjust the flow of liquid through the meters. The meter which is operating at a faster speed is provided with less fluid which causes it to slow down. The proportioning valve, therefore, maintains a flow of fluid through the meters in accordance with the predetermined ratio preselected on cone gear transmissions 34A and B.

An indication of the total or sum of the revolutions of the two meters is provided by the adding differential 42 which is a cage type differential, for example, including upper and lower cage gears 165A and B. Gears 165A and B are operatively engaged with the cone gear shafts through spur gears 166A and B. Spur gear 166A is operatively engaged with cone spur gear 134₅ of the cone gear engaged with meter 32A. This eliminates the need for one extra gear in connecting the motion of meter 32A to adding differential 42. The lower shaft 168 of the adding differential 42 is mounted within a bearing 170 provided within the externally threaded screw of differential 38. This provides a highly compact and economical assembly.

The sum of the meters' rotations is connected to the counter 50 through shaft 172 which is operatively connected with the internal gears 174 of the adding differential 42.

In Figs. 16 and 17 is shown a means for visually indicating to the customer that the ratio varying controls for transmissions 34A and B have not been tampered with. The ratio is varied by movement of the idler assemblies to successive steps of the cone gears by grasping removable pins 176A and B which are inserted within idler gear housings 148A and B. Pins 176A and B are supported in their successive positions by insertion through a train of holes 178A and B provided within indicia bearing plates 180A and B which are mounted across the upper and lower housing plates 46 and 44 by means of cap screws 182 for example. These indicia bearing plates 180A and B are cut away at 184A and B to permit the gears behind it to be seen by the operator. Pins 176A and B are anchored to plates 180A and B by means of chains 186A and B which are secured, for example, to a lower cap screw 182.

Small holes 188A and B are drilled through the knurled shafts of pins 176A and B to permit a wire 177 to be inserted therethrough and led through an adjacent hole 178. This wire is then sealed in its adjusted position to provide a predetermined proportion blend. A tag 179 revealing the price set by the gasoline company for the blend (see Fig. 17) may be affixed to the sealed wire 177 to indicate to the customer the established price for the blend that is being sold to him. This tag 179, however, is not absolutely necessary since the steps or percentages between the standard and premium brand might be indicated in conjunction with the various holes which would permit the customer to calculate the fair price for the blend on the basis of the percentage of the difference between the prices of the standard and premium gasolines. A tag 179 directly indicating a certified price, however, is more convenient and direct. The condition of the controls is readily exposed to the customer, for example, through a transparent panel 190 of an acrylic plastic for example, in the door 192 which seals off the front of the dispenser and conceals the exposed parts shown in Fig. 1.

Summary of operation

The apparatus shown in Figs. 1–14, 16 and 17 permits a gasoline service station to dispense three octane grades of gasoline from only two storage tanks, designated A and B for example. The A gasoline, for example, may be a premium or extremely high octane rating grade, and the B gasoline may be, for example, a low or regular octane grade of gasoline. The dispenser 10 is adjusted by the operator to blend the A or premium grade with the B or regular grade at predetermined relative proportions to provide an intermediate octane rating grade of gasoline. The ratio shifting means 36A and B permits the relative proportions of A and B fluids to be adjusted, for example, in 10% increments. This 10% increment variation is provided by moving the pins 176A and B in parallel relationship. A yoke which maintains these pins parallel to each other at all times may be provided to prevent misalignment of the pins. However, these pins may be moved individually if a greater number of steps or increments of variation are desired.

To insure that the purchaser receives a blend commensurate with the price he pays, the ratio shifting pins 176A and B may be sealed and certified by the gasoline suppliers or by approved inspectors to constitute a predetermined percentage of the price of the standard or premium grade or the difference therebetween. A convenient means of indicating to the customer the fair price of the blend is by sealing a price tag 177 to the pins. This seal and price tag are conveniently revealed to the purchaser through a transparent window 190 in panel 192 covering the machinery section of the dispsenser.

After the dispenser has been adjusted to provide a predetermined portion of A and B gasolines in the dispensed blend or mixture, it is operated in a manner similar to a conventional dispenser. The A and B fluids are separately pumped into the mixing valve block 24. The A and B blends flow through check valves 68A and B in the block and then through meters 32A and B which discharge them into the lower ports 80A and the upper ports 80B of mixing chamber 82. Valve element 88 proportions the amount of A and B fluids in the blend which leaves the chamber 82 through outlet 84. From outlet 84, the blend leaves the valve block 24 through passages 86 and 66 to enter the discharge pipe or conduit 28 which conducts it through a visible indicator 30 into the nozzle assembly 12.

If meters 32A and B are not rotating at the predetermined ratio, the nut and screw type differential 38 repositions valve stem 90 to adjust the flow of fluids from the meters to cause their rotational speeds to adjust to the predetermined ratio. The proportioning valve, therefore, automatically adjusts itself to substantially continuously maintain the preselected ratio of the A and B gasolines. If a blend including 50% of each gasoline is desired, for example, the valve will move in a direction to obstruct the flow from a meter whose rotational speed should exceed the rotational speed of the other. This maintains the speeds of both meters and the fluids pumped through them substantially constant.

Since the proportions of A and B fluid in the dispensed mixture are maintained substantially constant to an extremely high degree with a proven accuracy of over 99%, only a single counter need be used for computing the gallonage and cost from an input which is derived by adding differential 42 from the sum of the rotations of the two meters. An extremely simple, compact and economical assembly is accordingly provided.

If the supply of either of the base gasolines is exhausted, valve element 88 will move in a direction to immediately shut off the supply of the other base fluid. This automatically insures that the apparatus will not dispense an incorrect blend even if one gasoline should become exhausted. This automatic feature is highly advantageous because it is inherent in the mechanism and does not require auxiliary protective devices or electrical circuits.

The modification of the proportioning valve shown in Fig. 15 permits the proportioning valve described herein to be used in a dispenser which is intended to have its ratio changed frequently to accommodate individual purchasers. The flexible separator or diaphragm 126 maintains the A and B gasolines separate from each other until they are blended within a mixing nozzle (not shown). Mixing nozzles of this type are well known in the art. When the different gasolines are maintained separate until they are discharged into the tank of the purchaser, there is no necessity to flush the lines of the previous mixture before initiating the flow of a newly proportioned blend to the following purchaser.

A remote-type dispensing installation may be provided by installing assembly 25 as a self-contained unit between the remote pumps located within the storage tanks, for example, and the dispensers. In this remote type of installation, the adding differential could be eliminated together with its drive connection to the computer. The dispenser for the blend would then be like any conventional remote type dispenser with its own meter and computer. For details of an illustrative remote type system, refer to commonly assigned copending application S.N. 653,366, filed April 17, 1957, entitled, Fluid Dispensing System.

What is claimed is:

1. A unitary structure for an apparatus for dispensing dissimilar fluids in predetermined proportions comprising an internally channeled block including a proportioning chamber, a fluid supply inlet connected to said chamber, another fluid supply inlet connected to said chamber, an outlet connected to said chamber, a valve element movably mounted within said chamber, means connected to said valve element for adjusting same to alternately obstruct said fluid supply inlets, mounting means upon the exterior of said block upon which are mounted fluid meters having discharges aligned with said supply inlets, a differential mounted upon said block and operatively connected to said valve element for regulating its position in accordance with the relative speeds of said meters for maintaining a predetermined proportional flow through said meters, transmission means mounted upon said block and operatively engaging said meters with said differential for comparing the speeds of said meters and providing an indication of the ratio of said speeds to said valve element.

2. A structure as set forth in claim 1 wherein said differential is a nut and screw type differential and said transmission operatively engages one of said meters with said nut and the other of said meters with said screw.

3. A structure as set forth in claim 1 wherein said meters are operatively engaged with said differential by means of a variable ratio motion transmitting device to cause the motion of said valve element to regulate the flow of said fluids through said meters in accordance with preselectable ratios.

4. A structure as set forth in claim 3 wherein said variable ratio motion transmitting device is comprised of cone gear and idler devices.

5. A structure as set forth in claim 4 wherein said cone gears and idlers are rotatably supported between a pair of housing plates which are mounted upon said block, and one of said housing plates is mounted upon said block by means of a cylindrical housing surrounding said nut and screw type differential.

6. A structure as set forth in claim 5 wherein said cone gears are operatively engaged with said meters and said idlers are operatively engaged with said differential.

7. A structure as set forth in claim 2 wherein an adding differential is operatively engaged with said meters to provide the additive sum of their rotations to a counter, and a lower shaft of said adding differential is mounted within the screw of said nut and screw type differential.

8. A structure as set forth in claim 7 wherein one of said meters is connected to said adding differential through one gear of said cone gear device.

9. A structure as set forth in claim 4 wherein a ratio controlling idler gear shifting means is mounted between said upper and lower housing plates and said shifting means is operatively engaged with said idler gears.

10. A device as set forth in claim 9 wherein means are provided for sealing said shifting means at predetermined set positions.

11. A device as set forth in claim 10 wherein said dispenser panel adjacent said shifting means is constructed and arranged to permit visual inspection of the condition of said shifting means and seals.

12. A proportioning device comprising a cylindrical proportioning valve chamber, a pair of fluid inlet means in the wall of said chamber and longitudinally separated from each other, a fluid outlet means in the wall of said chamber between said inlet means, a pair of circumferential projections disposed about the inner wall of said chamber and separating said outlet means from said pair of inlet means, a valve element disposed between said projections, said valve element being constructed and arranged to regulate the fluids flowing from said inlets into said outlet in inverse relationship to each other, and said device includes a bearing means for permitting said valve element to be reciprocally moved for governing the proportion of fluids in accordance with a predetermined ratio, said valve element including a valve stem, a nut and screw type differential operatively coupled with said valve stem to regulate the position of said valve stem in accordance with information provided to said differential.

13. A device as set forth in claim 12 wherein said differential is mounted in line with said valve stem.

14. A device as set forth in claim 12 wherein said valve stem is connected to said differential by a rotatable yoke connecting means.

15. A device as set forth in claim 12 wherein a flexible sealing diaphragm is attached to said valve element, and said flexible diaphragm is attached to the walls of said chamber to maintain the proportioned fluids separate from each other within said chamber.

16. A device as set forth in claim 15 wherein a separating means is provided within said outlet means to maintain said proportioned fluids separate from each other within said outlet means.

17. A proportioning device comprising a cylindrical proportioning valve chamber, a pair of fluid inlet means in the wall of said chamber and longitudinally separated from each other, a fluid outlet means in the wall of said chamber between said inlet means, a pair of circumferential projections disposed about the inner wall of said chamber and separating said outlet means from said pair of inlet means, a valve element disposed between said projections, said valve element being constructed and arranged to regulate the fluids flowing from said inlets into said outlets in inverse relationship to each other, and said device includes a bearing means for permitting said valve element to be reciprocally moved for governing the proportion of fluids in accordance with a predetermined ratio, said valve element including a valve stem, a nut and screw type differential operatively coupled with said valve stem to regulate the position of said valve stem in accordance with information provided to said differential, said valve element also including a central portion having an outside diameter greater than the internal diameter of said circumferential projections to permit said valve to alternatively provide full shut off of the fluid supplied through either inlet means when said valve element moves into contact with the corresponding projections.

18. A device as set forth in claim 17 wherein tapered elements are disposed on both sides of said control portion to cooperate with said projections to throttle the flow of said fluids prior to full shut off.

19. A device as set forth in claim 18 wherein the outside diameter of said tapered elements is less than the inside diameter of projections to allow said central portion to fully contact said projections, said tapered elements being made of a material which is resistant to wear by fluid flow, and said central portion is made of a resilient material to facilitate full shut off.

20. A device as set forth in claim 17 wherein said projections are provided by a pair of ported sleeves inserted within said chamber on both sides of said valve element.

21. A device as set forth in claim 20 wherein said sleeves each include a finger of predetermined length which contacts the adjacent surfaces of said sleeves to maintain a predetermined clearance on both sides of said valve element.

References Cited in the file of this patent

UNITED STATES PATENTS

| | | |
|---|---|---|
| 1,985,918 | De Lancey | Jan. 1, 1935 |
| 2,057,226 | Bleecker | Oct. 13, 1936 |
| 2,065,128 | Eisinger | Dec. 22, 1936 |
| 2,151,239 | Slye et al. | Mar. 21, 1939 |
| 2,504,013 | Ellis | Apr. 11, 1950 |
| 2,743,843 | Bliss | May 1, 1956 |
| 2,848,139 | Chiantelassa | Aug. 19, 1958 |